M. S. CURTIS.
HOSE-COUPLING.

No. 185,896. Patented Jan. 2, 1877.

UNITED STATES PATENT OFFICE.

MOSELEY S. CURTIS, OF ANSONIA, CONNECTICUT, ASSIGNOR TO RICHARD R. COLBURN, OF SAME PLACE.

IMPROVEMENT IN HOSE-COUPLINGS.

Specification forming part of Letters Patent No. 185,896, dated January 2, 1877; application filed December 6, 1876.

*To all whom it may concern:*

Be it known that I, MOSELEY S. CURTIS, of Ansonia, in the county of New Haven and State of Connecticut, have invented a new Improvement in Hose-Coupling; and I do hereby declare the following, when taken in connection with the accompanying drawings and the letters of reference marked thereon, to be a full, clear and exact description of the same, and which said drawings constitute part of this specification, and represent in—

Figure 1:
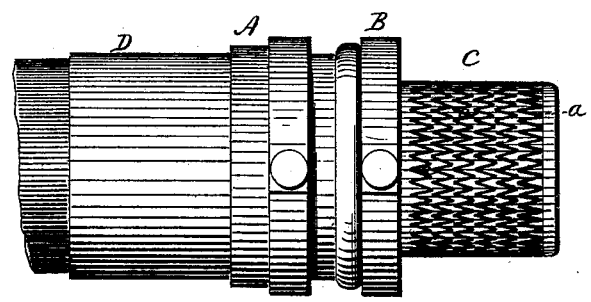
Figure 2:
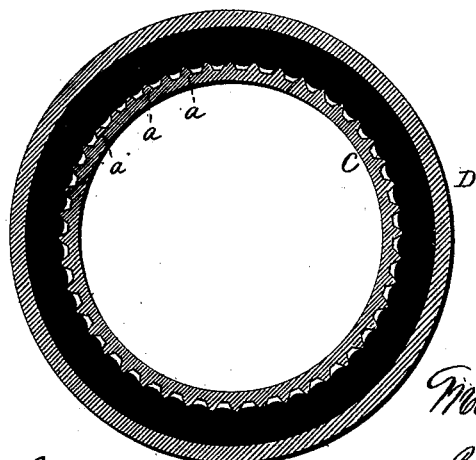

Figure 1 a side view, the hose attached to one part of the coupling and removed from the other; and in Fig. 2, a transverse section through the shank of the coupling.

This invention relates to an improvement in devices for coupling hose, with special reference to the method of securing the hose to the coupling. The usual method has been to construct the shank of the coupling, or that part which enters the hose, with annular ribs. Under great pressure these frequently draw out from the hose. The annular ribs, when the hose does not slip, tends to weaken the hose in a direct annular line, so that it is liable to tear on that line or rib.

The object of this invention is to overcome these difficulties and make the attachment permanent; and it consists in a series of ribs running in a zigzag line around the circumference, the angles forming points.

The coupling may be of any known construction—here represented as a screw-coupling in two parts, A B, each cast with a shank, C, to enter the end of the hose in substantially the usual manner. The shank C is constructed with several ribs, *a*, running in a zigzag line around the outer surface, preferably so close together that the points in one rib enter the opening in the next, as shown. The result of this is a largely-increased resisting-surface inside the hose, and the irregular line of the rib avoids that regular bearing or creasing surface of the straight rib, rendering it much less liable to break the hose on the line of the rib. Again, the angles or points which the rib forms, once embedded in the hose, any tendency to draw the hose from that surface compresses the material of the hose into the space between the points, and thereby increases the resistance. After the hose is placed upon the shank of the coupling a sleeve, D, is passed over the outside to gripe the hose upon the shank in substantially the usual manner, but other devices, as winding, &c., may be employed instead of such a sleeve, and in some cases, where the pressure is not too great, the resistance offered by this peculiar construction of shank is sufficient to retain the hose without any clamping device.

I claim—

The herein-described improvement in hose-couplings, consisting in the construction of the shank with a rib or ribs of zigzag form around the exterior surface, substantially as described.

MOSELEY S. CURTIS.

Witnesses:
VERRENICE MUNGER,
E. T. BARTLETT.